(12) United States Patent
Sudermann et al.

(10) Patent No.: US 9,895,640 B2
(45) Date of Patent: Feb. 20, 2018

(54) FILTER ELEMENT FOR A FILTER DEVICE FOR GAS FILTRATION

(71) Applicant: Mann+Hummel GMBH, Ludwigsburg (DE)

(72) Inventors: Arthur Sudermann, Muenchingen (DE); Marcel Hofmeister, Walheim (DE); Daniel Schmid, Sachsenheim (DE); Stefan Walz, Freiberg (DE); Matthias Krohlow, Herrenberg (DE); Thomas Sieber, Marklkofen (DE); Michael Kolmeder, Dingolfing (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 234 days.

(21) Appl. No.: 14/851,724

(22) Filed: Sep. 11, 2015

(65) Prior Publication Data

US 2016/0074794 A1 Mar. 17, 2016

(30) Foreign Application Priority Data

Sep. 12, 2014 (DE) ........................ 10 2014 013 281

(51) Int. Cl.
| | |
|---|---|
| *B01D 46/00* | (2006.01) |
| *F02M 35/02* | (2006.01) |
| *F02M 35/024* | (2006.01) |
| *B01D 46/10* | (2006.01) |

(52) U.S. Cl.
CPC ....... *B01D 46/002* (2013.01); *B01D 46/0005* (2013.01); *B01D 46/10* (2013.01); *F02M 35/0201* (2013.01); *F02M 35/0215* (2013.01); *F02M 35/02491* (2013.01); *B01D 2271/022* (2013.01); *B01D 2275/206* (2013.01)

(58) Field of Classification Search
CPC .. B01D 46/0005; B01D 46/002; B01D 46/10; B01D 2271/022; B01D 2275/206; F02M 35/0201; F02M 35/0215; F02M 35/02491
See application file for complete search history.

(56) References Cited

U.S. PATENT DOCUMENTS

| 2006/0174598 A1* | 8/2006 | Mills ..................... B01D 46/002 55/499 |
| 2012/0055127 A1* | 3/2012 | Holzmann ......... B01D 46/0001 55/484 |
| 2012/0079798 A1* | 4/2012 | Rafi ................... B01D 46/0005 55/484 |

(Continued)

FOREIGN PATENT DOCUMENTS

| DE | 102004005904 A1 | 9/2005 |
| DE | 102013208162 A1 | 11/2014 |

OTHER PUBLICATIONS

Machine translation of DE 102004005904, published Sep. 1, 2005.*

*Primary Examiner* — Robert Clemente
(74) *Attorney, Agent, or Firm* — James Hasselbeck

(57) ABSTRACT

A filter element for a filter device for gas filtration has at least two individual filters which are disposed adjacent to each other and through which the gas to be purified can flow orthogonally to the filter plane. On at least two sides, the individual filters delimit a gas collection chamber that is open on the edge side and that is fluidically connected to the clean sides of the individual filters and used to accommodate the purified gas.

20 Claims, 8 Drawing Sheets

(56) References Cited

U.S. PATENT DOCUMENTS

2014/0000228 A1* 1/2014 Enderich ............. B01D 46/002
                                                        55/484
2016/0082379 A1* 3/2016 Gensler ............... B01D 46/521
                                                        55/484

* cited by examiner

FILTER ELEMENT FOR A FILTER DEVICE FOR GAS FILTRATION

TECHNICAL FIELD

The invention relates to a filter element for a filter device for gas filtration, in particular for an air filter, according to the preamble of claim 1.

BACKGROUND

EP 1 447 250 A2 describes a filter system comprising a filter insert that is accommodated in a filter housing and comprises two plate-shaped individual filters, which are designed separately from each other and positioned adjacent to each other. The individual filters each have a rectangular shape; however, they have differing sizes and are accommodated in the filter housing with a vertical offset. The fluid to be purified flows through the filter elements orthogonally to the respective filter plane of the same.

DE 198 16 431 A1 describes a filter element for an air filter which is designed as a filter bellows having zigzag pleating, wherein the filter bellows has various pleat regions in which the pleat heights and/or the direction of the pleats differ from each other. The air to be purified flows through the filter bellows orthogonally to the filter plane of the same, wherein the incident flow side has a stepped design due to the differing heights of the various regions, while the clean sides of all filter regions are located in a common plane.

SUMMARY OF THE INVENTION

It is the object of the invention to design a filter element for a filter device for gas filtration in a compact and efficiently operating manner using simple design means.

The filter element according to the invention is used in filter devices for gas filtration, for example in air filters for filtering the combustion air to be supplied to an internal combustion engine or for purifying breathing air for a passenger compartment or a cabin. The filter element in particular has a planar or plate-shaped design and the gas to be purified flows through the element orthogonally to the filter plane of the same.

The filter element comprises at least two plate-shaped individual filters, through each of which the flow occurs orthogonally to the filter plane and which are disposed adjacent to each other. The two individual filters delimit a gas collection chamber, which is fluidically connected to the clean side of the individual filters and into which the purified gas flows. The gas collection chamber is delimited on at least two of the sides by the individual filters; at the same time, the chamber is designed to be open on an edge side via which the purified gas can flow out of the gas collection chamber. In addition to the function of accommodating the purified gas, the gas collection chamber also has a flow-steadying function, so that swirls and turbulences in the gas are reduced and a laminar outflow from the gas collection chamber is possible. Due to the lateral delimitation of the gas collection chamber by the individual filters of the filter element, the gas collection chamber is located at the same height as the individual filters, whereby a compact design is provided in the vertical direction—seen orthogonal to the filter plane. The outflow from the gas collection chamber preferably takes place via the region that is open on the edge side, so that no additional installation space for outflow lines is required in the vertical direction.

The incident flow side or raw side and the outflow side or clean side of the filter element are each formed by a lateral surface of the individual filters. From the clean side, the purified gas flows parallel to the filter plane in the direction of the gas collection chamber, in which the flow is steadied and from which subsequently the flow out of the filter housing in which the filter element is accommodated takes place.

The gas collection chamber can have various geometric shapes. According to an advantageous embodiment, the gas collection chamber has a rectangular design, wherein other angular, curved or round or partially round cross-sectional shapes are also possible, for example triangular or trapezoidal cross-sections or semi-round geometries.

According to an advantageous embodiment, the filter element has a U-shaped design, and the gas collection chamber is delimited at three of the sides thereof by the individual filters. In this embodiment, the gas collection chamber preferably has a rectangular design. In the case of a U-shaped design, the filter element is advantageously formed by a total of three individual filters, of which two exterior individual filters form the two limbs of the U shape, which are connected by a middle, shorter individual filter. The extension of the gas collection chamber, seen in the longitudinal direction of the limbs of the U shape, preferably ranges between 25% and 75%, for example 50%, of the longitudinal extension of the filter element, based on the longitudinal direction of the lateral limbs.

According to a further expedient embodiment, the filter element has exactly one gas collection chamber. In an alternative embodiment, it is also possible to provide more than one gas collection chamber in the filter element, for example two opposing gas collection chambers in the case of an H-shaped design of the filter element, which preferably each have a rectangular design and are each delimited on three sides by the individual filters of the filter element. The individual filters can be disposed directly adjacent to each other. A connecting element, by way of which the individual filters are connected to each other, can be disposed between the directly adjacent individual filters. For example, the connecting element is disposed as a sealing strip, which is preferably disposed on the clean sides of the individual filters. The sealing strip is implemented as a PUR web, for example. The connection element can optionally also be disposed on the raw sides of the individual filters so as to connect the individual filters to each other.

According to a further expedient embodiment, a peripheral sealing element is disposed on the clean side of the filter element along the outer contour, the sealing element separating the raw side from the clean side when the filter element is installed. The peripheral sealing element in the edge region of the filter element likewise connects the abutting individual filters.

The individual filters are designed as filter bellows comprising a filter medium pleated in a zigzag-shaped manner, for example. The zigzag pleating of the filter bellows preferably runs in the same direction for all individual filters. The filter pleats expediently run orthogonally to the edge side of the filter element on which the gas collection chamber that is open on the edge side is located, or parallel to this edge side. However, a design in which the individual filters have differing orientations of the filter pleats is also possible, for example one individual filter having filter pleats orthogonal to the edge side of the filter element comprising the gas collection chamber and another individual filter having filter pleats parallel to the edge side of the filter element comprising the gas collection chamber.

The individual filters have a planar or plate-shaped design, wherein the clean sides of all individual filters are preferably located in a common plane. Steps may be formed on the raw side if the individual filters have differing heights. According to an alternative embodiment, the raw sides of all individual filters are located in a common plane, wherein optionally the clean sides are provided with steps if the individual filters have differing heights. However, it is moreover also possible that all the individual filters have the same height, and that preferably the respective raw sides and clean sides are located in a common plane. It is advantageous if at least one side, which is to say either the clean side or the raw side, of all individual filters is located in a common plane.

The filter element is composed of at least two individual filters, which are preferably connected to each other. This results in an L-shaped filter element, for example. If the filter element has a U- or H-shaped design, it is expedient to provide a total of three individual filters, of which the middle individual filter has a shorter length in the direction of the longitudinal extension of the lateral individual filters forming the limbs.

In any case, it is expedient for the gas collection chamber to be disposed within the envelope of the filter, which encloses the outer contour of the filter element. In the case of a U- or H-shaped design, the envelope or outer contour is rectangular, wherein the gas collection chamber is located within this rectangular outer contour and preferably itself has a rectangular geometry.

The individual filters can have differing extensions or also a same extension orthogonal to the filter plane. Moreover, it is possible for the individual filters to have the same extension or differing extensions in one direction or in both directions of the filter plane. For example, it is expedient in the case of a U-shaped design of the filter element for the two lateral individual filters to have a same length in the direction of the longitudinal extension of the lateral limbs, while the lateral individual filters can have differing widths. However, it is also possible for the lateral individual filters to have the same width. The middle individual filter can have the same width as an adjoining individual filter or it can also have a different width.

The filter element composed of multiple individual filters is inserted into a filter housing, wherein the gas collection chamber of the filter element is advantageously fluidically connected to an outflow connector which is introduced into the filter housing and via which the purified gas is discharged from the filter device. The outflow connection can be introduced into the filter housing in such a way that the longitudinal axis of the outflow connector runs parallel to the filter plane of the filter element. Moreover, it is advantageous for the inner diameter of the outflow connector via which the purified gas is discharged from the gas collection chamber to at least partially overlap the filter element, so that at least a portion of the filter element and the outflow connector are disposed at the same height in the filter housing. This not only reduces the installation space height, but also allows the gas to be discharged directly from the gas collection chamber via the outflow connector.

According to a further expedient embodiment, the basic shape of the gas collection chamber corresponds to a cut-out from the filter element. The filter element is in particular cut out on the edge side, wherein the cut-out forms the gas collection chamber. For example, in the case of a block-shaped filter medium body of the filter element on which the filtration takes place, a region adjoining the edge may be cut out, for example in a rectangular shape, a triangular shape or as a semicircle forming the gas collection chamber. The gas collection chamber thus directly connects to the edge region of the cut-out filter medium body.

In contrast, it is provided in an alternative embodiment that the basic shape of the gas collection chamber is smaller than the cut-out from the filter medium body of the filter element. In this embodiment, a larger cut-out is preferably made in the edge region of the filter medium body, for example in a rectangular shape, a triangular shape or as a semicircle or the like, wherein the space remaining between the gas collection chamber and the edge side of the filter element is filled by a sealing compound, for example PUR. It may be expedient for the edge region of the gas collection chamber to be surrounded by the sealing element, which is designed in particular in one piece with the sealing element extending around the periphery in the edge region of the filter medium body of the filter element.

According to still another expedient embodiment, a peripheral plastic frame is disposed on, for example molded onto, the filter element, in particular onto the filter medium body of the filter element. The plastic frame is rigidly connected to the filter medium body and can be a carrier for the peripheral sealing element. The plastic frame is located on the edge side or outer side of the filter medium body and thus follows the outer contour of the filter medium body.

BRIEF DESCRIPTION OF THE DRAWINGS

Further advantages and advantageous embodiments will be apparent from the remaining claims, the description of the figures, and the drawings. In the drawings:

In the figures, identical components are denoted by the same reference numerals.

DETAILED DESCRIPTION OF THE INVENTION

Figure 1:
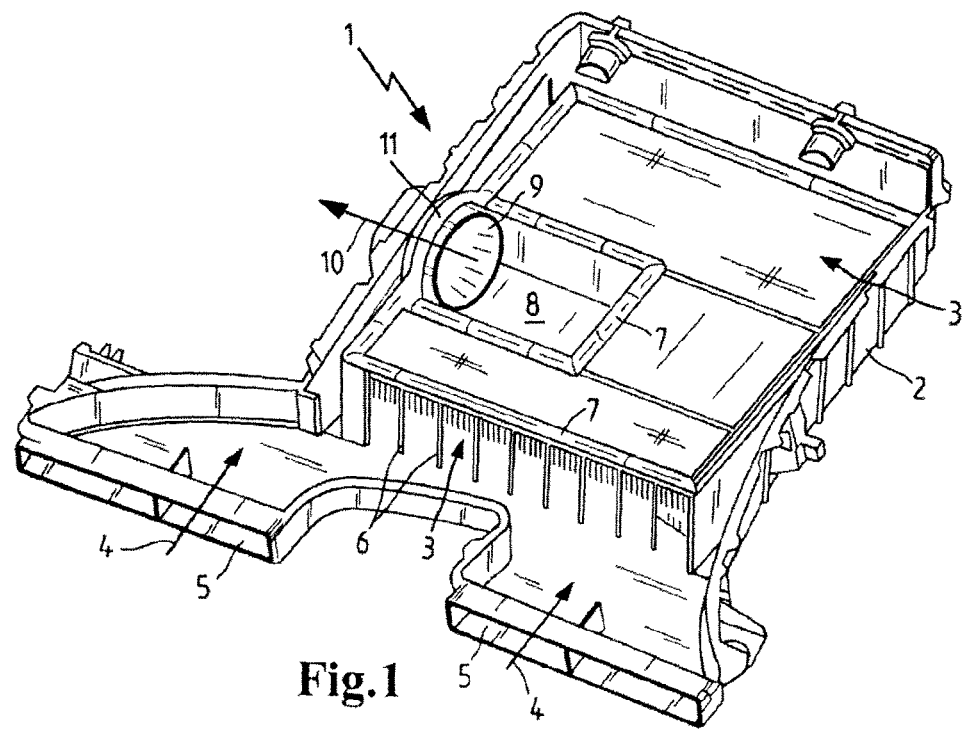
FIG. 1 shows a filter device implemented as an air filter, comprising a plate-shaped filter element having a U-shape, which delimits a clean-side gas collection chamber via which the purified gas can be supplied to an outflow connector so as to be discharged from the filter housing.

FIG. 1 shows a filter device 1 for gas filtration, which can be used as an air filter for filtering the combustion air to be supplied to the internal combustion engine of a vehicle. In a filter housing 2, the filter device 1 comprises a U-shaped filter element 3 having a planar or plate-shaped design, wherein in FIG. 1 the side of the filter element 3 located at the bottom represents the raw side and the side located at the top represents the clean side. The incident flow takes place according to the arrows 4 via inlets 5 in the filter housing 2, wherein the raw side of the filter element 3 is separated from the inlets 5 by support ribs 6 of the filter housing 2. The support ribs 6 have a supporting function for a peripheral sealing element 7 on the top side or clean side of the filter element 3. The sealing element 7 extends along the U-shaped outer contour on the top side of the filter element 3. The support ribs 6 allow the untreated air to flow in and to the raw side of the filter element 3 located at the bottom; optionally, they can also have a flow-guiding function, in addition to the support function.

A gas collection chamber 8 for the purified gas flowing from the clean side of the filter element 3 located at the top into the gas collection chamber 8 is formed in the U-shaped region of the filter element 3. The gas collection chamber 8 is located within the rectangular outer contour or envelope of the filter element 3 and is delimited by the filter element 3 on three sides. The gas collection chamber 8 is designed to be open on the edge side, and a housing-side outflow connector 9, via which the purified gas collected in the gas collection chamber is discharged from the filter housing according to the arrow 10, is located in the region of the open side of the chamber. The arrow 10 at the time marks the longitudinal axis of the outflow connector 9. On the side facing the gas collection chamber 8, the outflow connector 9 has a tulip- or trumpet-shaped flaring, which ensures improved discharge of the gas from the gas collection chamber 8.

In addition to collecting the purified gas flowing out at the top side on the filter element 3, the gas collection chamber also has a flow-steadying function. In this way, a laminar outflow of the purified gas according to arrow 10 via the outflow connector 9 is supported.

A sealing handle 11, which bridges the gas collection chamber 8 and rests on the lateral face of the outflow connector 9, is designed in one piece with the sealing element 7 at the top side or clean side of the filter element 3, which extends around the periphery of the filter element 3 along the outer contour.

Figure 2:
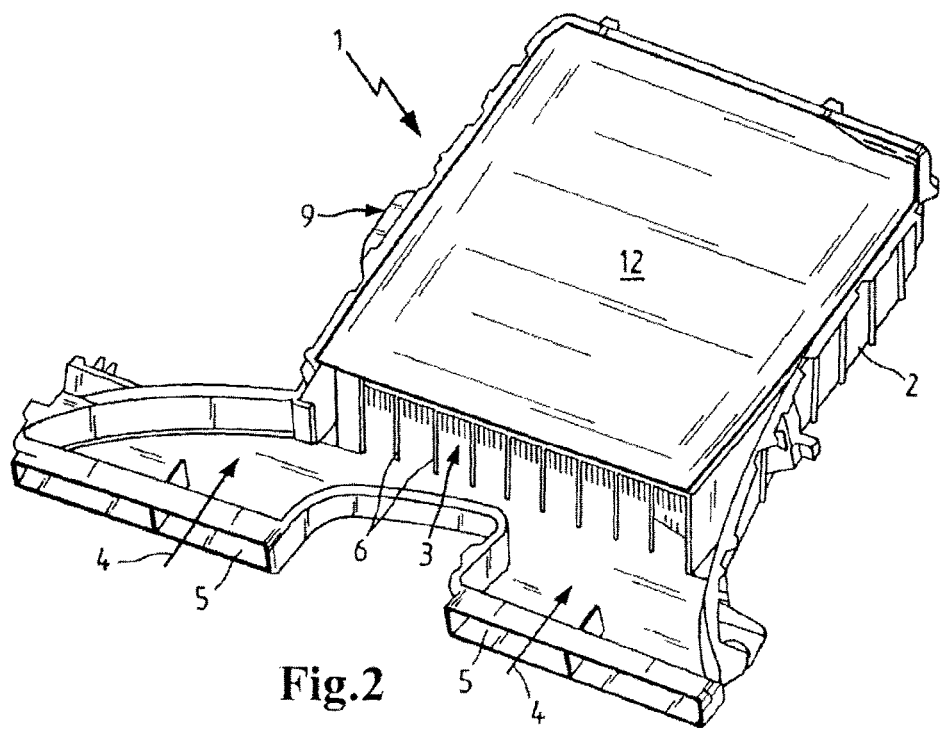
FIG. 2 shows the filter device according to FIG. 1, having a cover element attached to the filter element.
Figure 3:
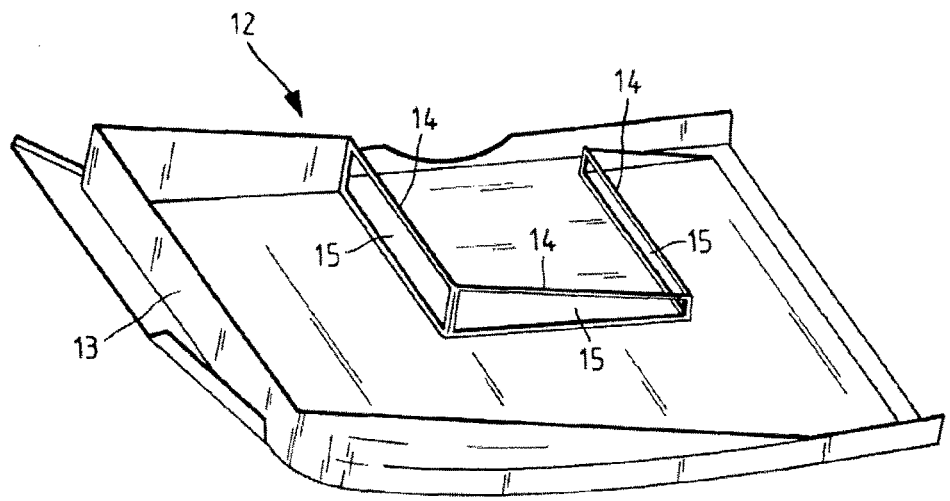
FIG. 3 shows the cover element in a view from beneath.

FIG. 2 shows the filter device 1 comprising a plastic cover element 12, which is attached to the filter element 3. FIG. 3 shows the cover element 12 in a view from beneath, from which it is discernible that a peripheral sealing frame 13 is integrally molded onto the cover element 12, the sealing frame resting on the peripheral sealing element 7 (FIG. 1) when installed and delimiting a clean space on the clean side of the filter element 3 located at the top with respect to the outside. Moreover, as is also apparent from FIG. 3, a support frame 14 is integrally molded onto the inner side of the cover element 12, the support frame corresponding to the rectangular contour of the gas collection chamber 8 and apertures 15 being introduced therein, via which the purified gas flows from the clean side of the filter element inward in the direction of the gas collection chamber 8.

Figure 4:
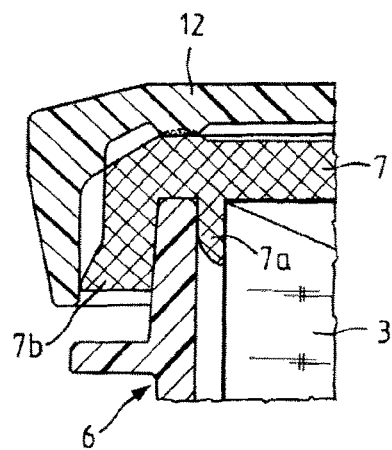
FIG. 4 is a sectional view through the edge region of the filter element.

FIG. 4 shows a sectional view through the edge region of the filter element 3 comprising the peripheral sealing element 7, which acts in a radially sealing manner and is supported on the filter housing 2 made of plastic material by way of the support ribs 6 or a cross member borne by the support ribs 6. A sealing lip 7a is located between the support ribs 6 or the cross member and the filter element 3. A further, bent sealing lip 7b is located on the outer side of the support rib 6 or the cross member. The cover element 12 is fitted over the sealing lip 7b and the sections of the sealing element 7 located at the top.

Figure 5:
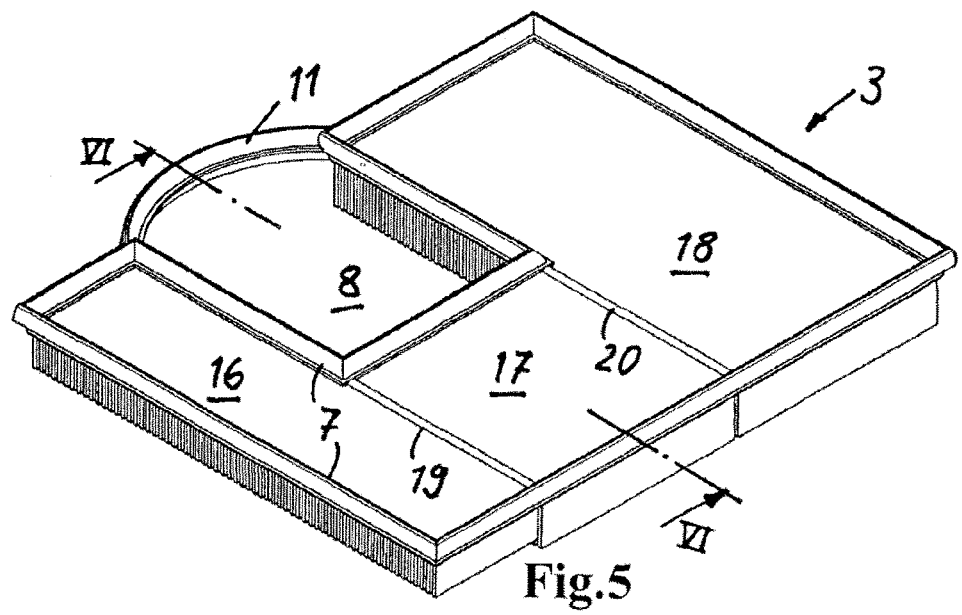
FIG. 5 shows a perspective illustration of the filter element.
Figure 6:
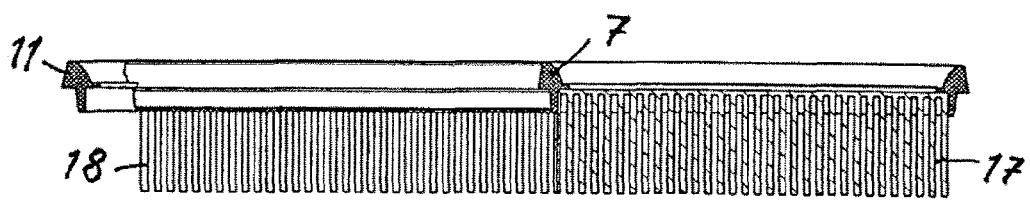
FIG. 6 shows a sectional view according to intersecting line VI-VI from FIG. 5 through the filter element.

FIGS. 5 and 6 show the filter element 3 in a single representation. The U-shaped filter element 3 is composed of three individual, separately implemented individual filters, which are designed as filter bellows 16, 17 and 18, each of which comprises a pleated filter means and has a planar or plate-shaped design. The clean sides of all filter bellows 16, 17 and 18 at the top are located in a common plane, while the raw sides at the bottom are located in different planes due to differing heights of the filter bellows. The two exterior filter bellows 16 and 18 form the limbs of the U shape, the middle filter bellows 17 located in between connecting the two exterior filter bellows 16 and 18. The filter bellows 16, 17 and 18 delimit the rectangular gas collection chamber on three different sides. The filter element 3 also has an overall rectangular shape, wherein the gas collection chamber 8 is located within the envelope or outer contour of the rectangular shape of the filter element 3 and is designed to be open on the edge side. The first exterior filter bellows 16 has a lower height than the two further filter bellows 17 and 18, which are designed to have the same height. The length of the gas collection chamber 8—seen along the longitudinal extension of the lateral limbs 16 and 18—corresponds to approximately half the total length of the filter element 3.

Figure 7:
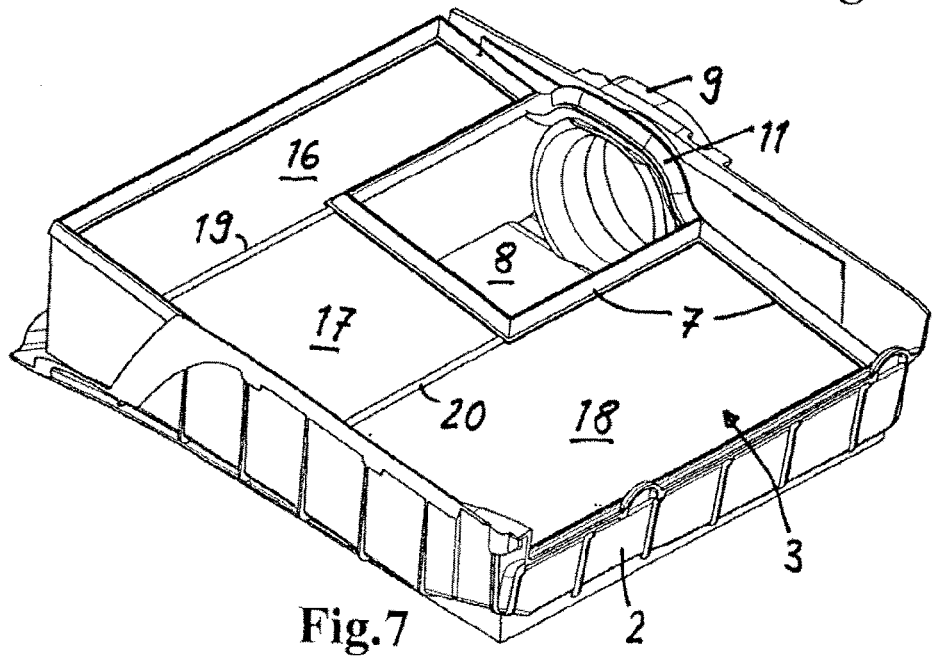
FIG. 7 shows a perspective illustration of the filter element inserted into the filter housing.

On the open side, the sealing handle 11 spans the gas collection chamber 8 in the region of the outer contour of the filter element, the sealing handle resting on the outer lateral face of the outflow connector 9 when it is installed (FIG. 7). In the exemplary embodiment according to FIGS. 5 to 7, the sealing handle 11 is designed in one piece with the sealing element 7 on the clean side of the filter element 3. The sealing element 7 and the sealing handle 11 are molded onto the filter element 3.

In the non-deformed state (FIGS. 5, 6), the sealing handle 11 is located in the same plane as the peripheral sealing element 7 and is convexly curved to the outside, so that the actual length of the sealing handle 11 is larger than the width of the gas collection chamber 8 to be bridged. This makes it possible to fold the sealing handle 11 up 90°, as shown in FIG. 7, and thereby deform the same three-dimensionally, so that the sealing handle rests on the outer lateral face of the outflow connector 9 in the filter housing 2.

Two abutting filter bellows 16, 17 and 17, 18 are held together by a respective sealing strip 19 and 20. Otherwise, the filter bellows 16, 17, 18 are located directly adjacent to each other. The peripheral sealing element 7 also holds the filter bellows 16 to 18 together.

The extension in the transverse direction, which is to say transverse to the longitudinal extension along the exterior filter bellows 16 and 18 forming the limbs, can be different for the filter bellows in terms of size. In the exemplary embodiment, the first exterior filter bellows 16 has a smaller transverse extension than the two further filter bellows 17 and 18, which are approximately identical in size in the transverse direction.

Figure 8:
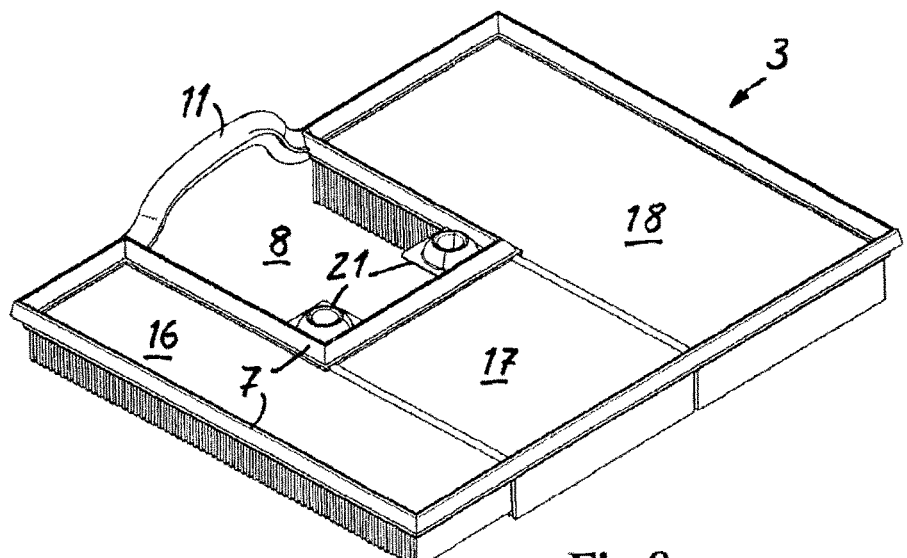
FIG. 8 shows the filter element in one variant embodiment having sealing eyes in the gas collection chamber, wherein the sealing eyes are connected to a peripheral sealing element at the filter element.
Figure 9:
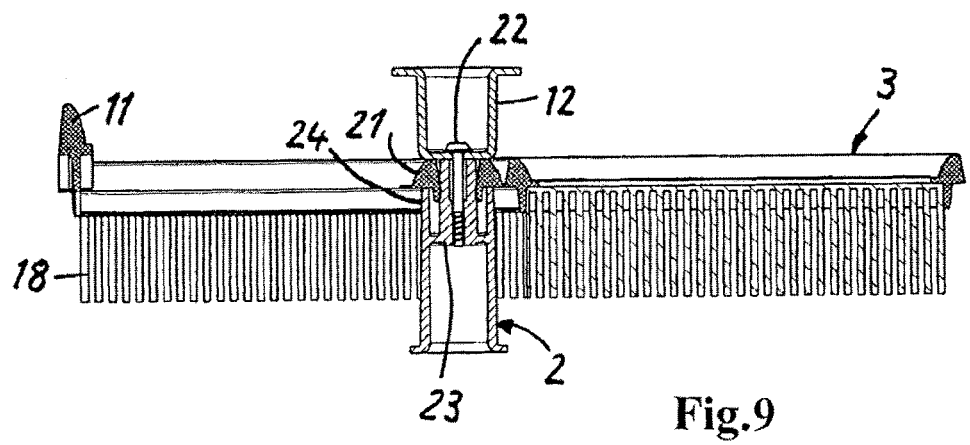
FIG. 9 shows a sectional view through the filter element in the region of a sealing eye through which a tension rod is guided so as to connect the filter housing to the cover element.

FIGS. 8 and 9 show a variant embodiment in which the filter element 3 has essentially the same composition as in FIG. 5. However, additionally sealing eyes 21 are integrally formed onto the peripheral sealing element 7, which are used to accommodate a tension rod via which the cover element 12 is to be connected to the filter housing 2 in the region of the sealing eyes 21 by way of a screw connection. The sealing eyes 21 are located in the gas collection chamber 8 on the side facing the middle filter bellows 7 and are preferably designed in one piece with the sealing element 7. The tension rod 22 is inserted from above in a recess in the cover element 12 and screwed into a mandrel 23 of the filter housing 22, which projects upwardly from the filter housing 2 located at the bottom and is located in the corner region of the gas collection chamber 8. The sealing eye 21 encloses the mandrel 23 and is supported on an annular shoulder 24 of the mandrel 23. The end face of the sealing eye 21 located at the top is acted upon axially by the recess in the cover element, on which the head of the tension rod 22 also rests. By screwing the tension rod 22 into the mandrel 23, a pressure is axially exerted on the sealing eye 21, so that the clean space located at the top is separated from the raw side located at the bottom in a flow-sealed manner.

Figure 10:
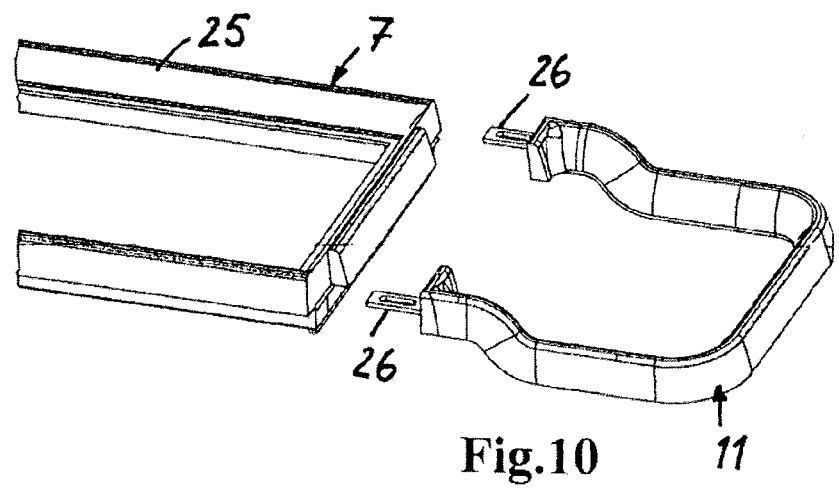
FIGS. 10,11 in one variant embodiment show the illustration of a sealing handle on a frame which can be attached to a filter bellow, wherein the sealing handle comprises a separate plastic component onto which a sealing foam is integrally molded.
Figure 11:
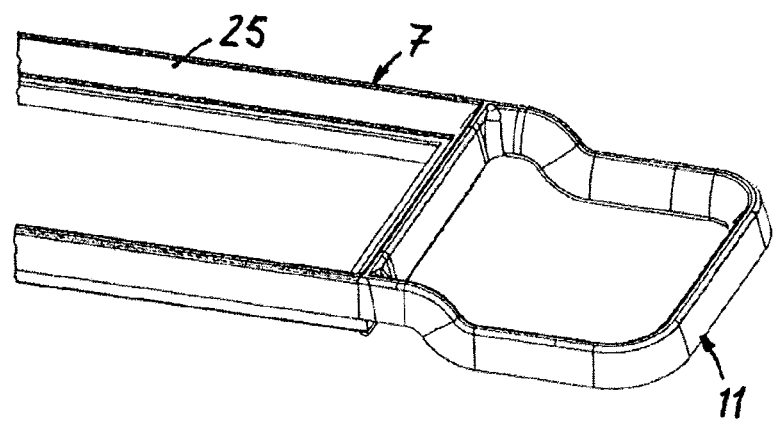

FIGS. 10 and 11 show a variant embodiment for producing a peripheral sealing element 7. Contrary to the previous exemplary embodiments, the sealing element 7 is not molded onto the filter element, but according to FIGS. 10 and 11 rather a carrier 25 made of plastic material, which forms a frame, is connected, in particular adhesively bonded, to the filter element or the filter bellows. The frame 25 can subsequently be provided with a sealing material, for example a PUR foam that is applied in a metered manner.

The sealing handle 11, which rests on the outflow connector, is designed as a separate component and, analogous to the sealing element 7, is composed of a carrier made of plastic material, which has a U-shaped design and at the two end faces thereof comprises a respective connecting tab 26 for the connection to the frame 25. After the sealing handle 11 is connected to the frame 25 (FIG. 11), the frame 25 and the plastic carrier of the sealing handle 11 can be provided with sealing material in a joint step.

The sealing handle 11 has a three-dimensionally deformed shape and in particular is adapted to the outer contour of the outflow connector.

Figure 12:
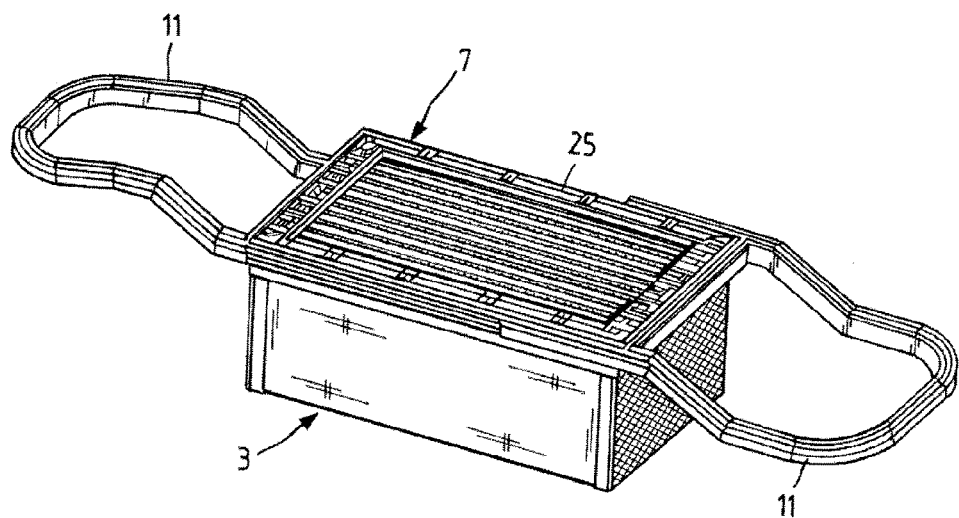
FIG. 12 in one variant embodiment shows two sealing handles on opposing sides of a filter bellows, wherein the sealing handles are designed in one piece with a frame element on the filter bellows and provided with sealing material.

In the exemplary embodiment according to FIG. 12, the sealing handle 11 is designed in one piece with the sealing element 7. As in the exemplary embodiment according to FIGS. 10 and 11, the sealing element 7 is composed of a frame 25 made of plastic material, which is connected to the filter element 3, for example by way of adhesive bonding. The plastic carrier of the sealing handle 11 is designed in one piece with the frame 25 and is three-dimensionally deformed, and according to the left half of the image in FIG. 12 it is elbowed upwardly with respect to the plane of the frame 25 and according to the right half of the image in FIG. 12 it is elbowed downwardly. The frame 25 and the plastic carrier of the sealing handle 11 are provided with sealing material in a joint step, which can be molded on, for example.

Figure 13:
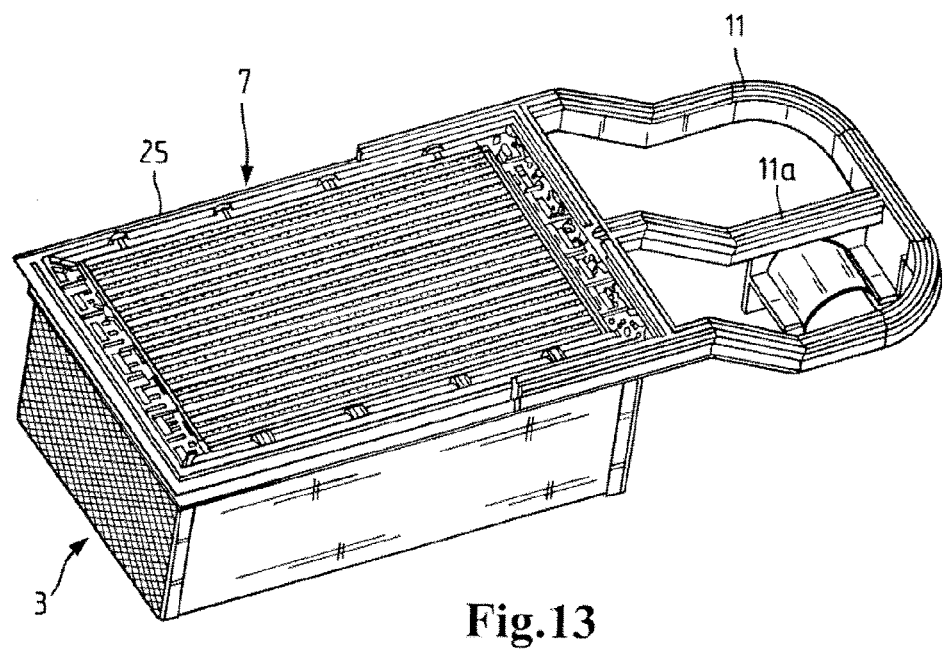
FIG. 13 shows an embodiment similar to that of FIG. 12, however having a deviating geometry of the sealing handle.

As in FIG. 11, in the exemplary embodiment according to FIG. 13 the sealing element 7 is provided with a frame 25, the plastic carrier of the sealing handle 11 being designed in one piece with the frame. The frame 25 and the plastic carrier of the sealing handle can be provided with sealing material together. Contrary to FIG. 12, an additional web 11a may be integrally molded in the sealing handle 11, the web extending centrally between the U-shaped sealing handle 11 and improving stability. The additional web 11a can moreover be a carrier for further functional plastic parts. The web 11a can also be provided with sealing material.

Figure 14:
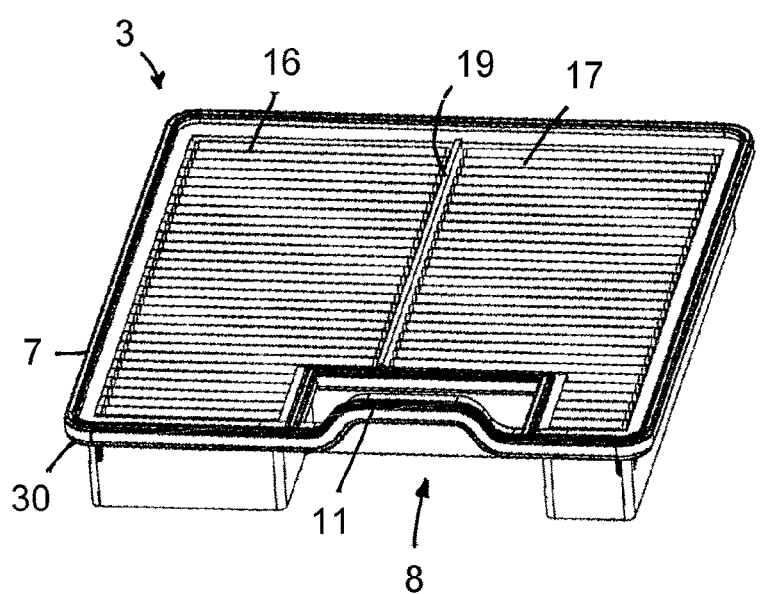
FIG. 14 shows a further filter element comprising a rectangular gas collection chamber and two individual filters, which are each designed as filter bellows having filter pleats.

In the exemplary embodiment according to FIG. 14, the filter element 3 comprises two filter bellows 16 and 17, which each have a rectangular design and are identical in size. The filter pleats of the two filter bellows 16 and 17 run in parallel; in addition, they are located in parallel to the edge side into which the gas collection chamber 8 is introduced by cutting out. The two filter bellows 16 and 17 are connected via the sealing strip 19.

The gas collection chamber 8 has a rectangular basic shape; it is introduced asymmetrically into the filter element 3 in such a way that the cut-out forming the gas collection chamber takes up a larger portion of the filter bellows 17 and a smaller portion of the filter bellows 16. In this way, the gas collection chamber 8 is disposed laterally offset with respect to a longitudinal center plane, in which the sealing strip 19 is also located.

A peripheral plastic frame 30 is molded onto the filter element 3, the frame following the outer contour of the filter element 3 comprising the two filter bellows 16 and 17 and being the carrier for the sealing element 7. The plastic frame 30 also follows the cut-out that forms the gas collection chamber 8. In addition, the gas collection chamber 8 is bridged in a handle-shaped manner in the region of the cut-out along the outer contour; the sealing element, which likewise rests on the plastic frame 30 in this region, forms the sealing handle 11 together with the plastic frame 30. The plastic frame 30 is deformed in a handle-shaped manner in the bridging section, wherein the handle is located above the plane of the plate-shaped sealing bellows 16 and 17.

Figure 15:
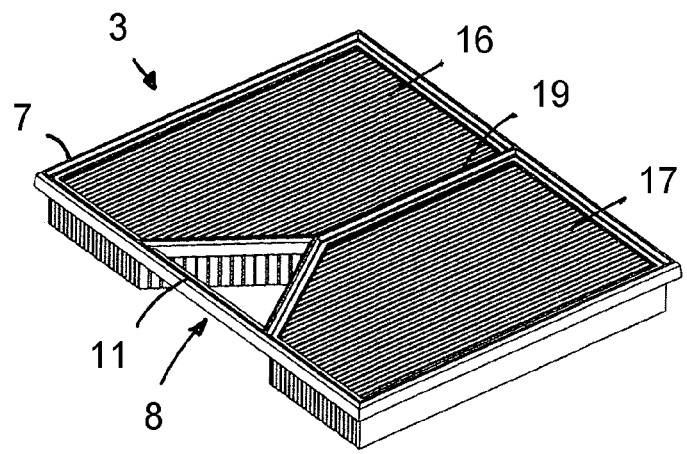
FIG. 15 shows a filter element in a further variant embodiment comprising a triangular gas collection chamber.

In the exemplary embodiment according to FIG. 15, the filter element 3 comprises two plate-shaped filter bellows 16 and 17 having filter pleats running in parallel. A connecting sealing strip 19 is located between the two filter bellows 16 and 17. The gas collection chamber 8 is formed by a triangular cut-out in the filter bellows 16 and 17, the cut-out being symmetrically introduced, wherein the open triangle side faces the edge region of the filter element. A sealing element 7, which may optionally be seated on a plastic frame that is molded directly onto the filter bellows 16 and 17, extends around the periphery on the outer contour of the filter bellows 16 and 17. The triangular gas collection chamber 8 is symmetrically introduced into the filter element 3.

The filter pleats of the filter bellows 16 and 17, which run in parallel to each other, extend orthogonally to the edge side of the filter element 3 into which the cut-out forming the gas collection chamber 8 is introduced. The gas collection chamber 8 is also bridged by the sealing element 7 in the region of the outer contour of the filter element 3, the sealing element forming a sealing handle 11 in this section. A peripheral plastic frame may be provided, which follows the contour of the gas collection chamber 8 and moreover bridges the gas collection chamber in the region of the envelope of the filter element.

Figure 16:
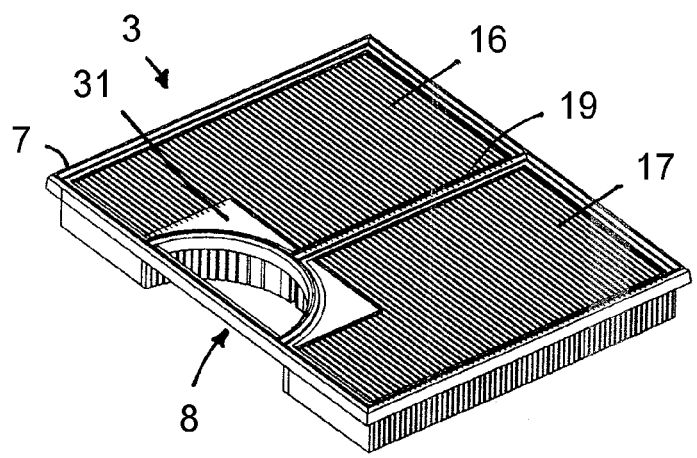
FIG. 16 shows a filter element in still another variant embodiment, having a rectangular cut-out in the edge region of the filter element and a circular segment-shaped gas collection chamber, wherein the space remaining between the gas collection chamber and the edge side of the filter element is filled by a sealing compound.

In the exemplary embodiment according to FIG. 16, the two filter bellows 16 and 17 are likewise designed with filter pleats running in parallel, however they extend in parallel to the edge side of the filter element 3 into which the cut-out comprising the gas collection chamber 8 is introduced. The peripheral sealing element 7 is either applied directly to the filter bellows 16, 17 or is located on a molded-on plastic frame that is molded onto the filter bellows.

The cut-out forming the gas collection chamber 8 is symmetrically introduced into the two filter bellows 16 and 17 and has a rectangular shape. However, the gas collection chamber 8 is provided with a circular segment-shaped base area; the space remaining between the circular segment-shaped gas collection chamber and the edge side of the filter bellows 16, 17 comprising the rectangular cut-out is filled with a sealing compound 31, which is PUR, for example.

What is claimed is:

1. A filter element for a filter device for gas filtration, comprising:
   at least two plate-shaped individual filters;
   wherein the at least two plate-shaped individual filters are disposed adjacent to each other and through which the gas to be purified can flow orthogonally to a filter plane;
   wherein the at least two plate-shaped individual filters on at least two sides delimit a gas collection chamber that is open on an edge side and that is fluidically connected to the clean sides of the at least two plate-shaped individual filters and used to accommodate the purified gas;
   wherein the filter element has a U-shaped design, and
   wherein the gas collection chamber is delimited by the at least two plate-shaped individual filters on three sides.

2. The filter element according to claim 1, wherein
   the at least two plate-shaped individual filters are connected to each other via a connecting element;
   wherein the connecting element is a sealing strip which connects the at least two plate-shaped individual filters to each other on a raw side or on a clean side of the at least two plate-shaped individual filters.

3. The filter element according to claim 1, wherein
   the at least two plate-shaped individual filters are each designed as filter bellows having filter pleats.

4. The filter element according to claim 3, wherein
   the filter pleats of the filter bellows of the at least two plate-shaped individual filters run orthogonally to the edge side of the filter element on which the gas collection chamber that is open on the edge side is located.

5. The filter element according to claim 3, wherein
   the filter pleats of the filter bellows run in parallel to an edge side of the filter element on which the gas collection chamber that is open on the edge side is located.

6. The filter element according to claim 1, wherein
   the at least two plate-shaped individual filters is a total of three abutting individual filters.

7. A filter element for a filter device for gas filtration, comprising:
   at least two plate-shaped individual filters;
   wherein the at least two plate-shaped individual filters are disposed adjacent to each other and through which the gas to be purified can flow orthogonally to a filter plane;
   wherein the at least two plate-shaped individual filters on at least two sides delimit a gas collection chamber that is open on an edge side and that is fluidically connected to the clean sides of the at least two plate-shaped individual filters and used to accommodate the purified gas;
   wherein the filter element has an H-shaped design and delimits two opposing gas collection chambers.

8. The filter element according to claim 7, wherein
   the at least two plate-shaped individual filters are connected to each other via a connecting element;
   wherein the connecting element is a sealing strip which connects the at least two plate-shaped individual filters to each other on a raw side or on a clean side of the at least two plate-shaped individual filters.

9. A filter element for a filter device for gas filtration comprising:
   at least two plate-shaped individual filters;
   wherein the at least two plate-shaped individual filters are disposed adjacent to each other and through which the gas to be purified can flow orthogonally to a filter plane;
   wherein the at least two plate-shaped individual filters on at least two sides delimit a gas collection chamber that is open on an edge side and that is fluidically connected to the clean sides of the at least two plate-shaped individual filters and used to accommodate the purified gas;
   wherein the basic shape of the gas collection chamber of the filter element corresponds to a cut-out from the at least two plate-shaped individual filters.

10. The filter element according to claim 9, wherein
    the basic shape of the gas collection chamber of the filter element is smaller than the cut-out from the at least two plate-shaped individual filters, the space remaining between the gas collection chamber and the edge side of the at least two plate-shaped individual filters being filled by a sealing compound.

11. A filter element for a filter device for gas filtration, comprising:
    at least two plate-shaped individual filters;
    wherein the at least two plate-shaped individual filters are disposed adjacent to each other and through which the gas to be purified can flow orthogonally to a filter plane;
    wherein the at least two plate-shaped individual filters on at least two sides delimit a gas collection chamber that is open on an edge side and that is fluidically connected to the clean sides of the at least two plate-shaped individual filters and used to accommodate the purified gas;
    wherein the at least two plate-shaped individual filters are connected to each other via a connecting element;
    wherein the connecting element is a sealing strip which connects the at least two plate-shaped individual filters to each other on a raw side or on a clean side of the at least two plate-shaped individual filters;
    wherein the raw sides and/or the clean sides of the at least two plate-shaped individual filters are located in a common plane.

12. A filter element for a filter device for gas filtration comprising:
    at least two plate-shaped individual filters;
    wherein the at least two plate-shaped individual filters are disposed adjacent to each other and through which the gas to be purified can flow orthogonally to a filter plane;
    wherein the at least two plate-shaped individual filters on at least two sides delimit a gas collection chamber that is open on an edge side and that is fluidically connected to the clean sides of the at least two plate-shaped individual filters and used to accommodate the purified gas;

wherein the at least two plate-shaped individual filters each have differing extensions orthogonal to the filter plane.

13. The filter element according to claim 12, wherein
the at least two plate-shaped individual filters are connected to each other via a connecting element;
wherein the connecting element is a sealing strip which connects the at least two plate-shaped individual filters to each other on a raw side or on a clean side of the at least two plate-shaped individual filters.

14. A filter element for a filter device for gas filtration, comprising:
at least two plate-shaped individual filters;
wherein the at least two plate-shaped individual filters are disposed adjacent to each other and through which the gas to be purified can flow orthogonally to a filter plane;
wherein the at least two plate-shaped individual filters on at least two sides delimit a gas collection chamber that is open on an edge side and that is fluidically connected to the clean sides of the at least two plate-shaped individual filters and used to accommodate the purified gas;
wherein the at least two plate-shaped individual filters each have differing extensions in at least one direction located in the filter plane.

15. The filter element according to claim 14, wherein
the gas collection chamber has a round, oval rectangular or triangular basic shape.

16. The filter element according to claim 14, wherein
a peripheral sealing element is disposed on the clean side of the filter element along an outer contour of the filter element.

17. The filter element according to claim 14, wherein
a peripheral plastic frame is molded onto at least two plate-shaped the individual filters.

18. The filter element according to claim 14, wherein
the at least two plate-shaped individual filters are connected to each other via a connecting element;
wherein the connecting element is a sealing strip which connects the at least two plate-shaped individual filters to each other on a raw side or on a clean side of the at least two plate-shaped individual filters.

19. A filter device, comprising:
a filter housing;
a filter element arranged in the filter housing, the filter element comprising:
at least two plate-shaped individual filters;
wherein the at least two plate-shaped individual filters are disposed adjacent to each other and through which the gas to be purified can flow orthogonally to a filter plane;
wherein the at least two plate-shaped individual filters on at least two sides delimit a gas collection chamber that is open on an edge side and that is fluidically connected to the clean sides of the at least two plate-shaped individual filters and used to accommodate the purified gas;
wherein the at least two plate-shaped individual filters each have differing extensions in at least one direction located in the filter plane.

20. The filter device according to claim 19, wherein
an outflow connector via which the purified gas can be discharged from the filter housing is arranged within the filter housing, the outflow connector adjoining the gas collection chamber.

* * * * *